United States Patent
Bruno et al.

(10) Patent No.: US 11,192,655 B2
(45) Date of Patent: Dec. 7, 2021

(54) REGENERATIVE SYSTEM ECOECS

(71) Applicant: Hamilton Sundstrand Corporation, Charlotte, NC (US)

(72) Inventors: Louis J. Bruno, Ellington, CT (US); Thomas M. Zywiak, Southwick, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 334 days.

(21) Appl. No.: 15/802,947

(22) Filed: Nov. 3, 2017

(65) Prior Publication Data
US 2019/0135441 A1    May 9, 2019

(51) Int. Cl.
| | | |
|---|---|---|
| *B64D 13/08* | (2006.01) | |
| *B64D 13/06* | (2006.01) | |
| *B64D 13/02* | (2006.01) | |

(52) U.S. Cl.
CPC .............. *B64D 13/08* (2013.01); *B64D 13/02* (2013.01); *B64D 13/06* (2013.01); *B64D 2013/0611* (2013.01); *B64D 2013/0618* (2013.01); *B64D 2013/0648* (2013.01); *B64D 2013/0662* (2013.01); *B64D 2013/0685* (2013.01); *B64D 2013/0688* (2013.01)

(58) Field of Classification Search
CPC ........ B64D 13/08; B64D 13/06; B64D 13/02; B64D 2013/0688; B64D 2013/0685; B64D 2013/0611; B64D 2013/0662; B64D 2013/0648; B64D 2013/0618
See application file for complete search history.

(56) References Cited

U.S. PATENT DOCUMENTS

| | | | | |
|---|---|---|---|---|
| 3,208,234 A | * | 9/1965 | Messinger ............. | B64D 13/06 62/172 |
| 4,550,573 A | * | 11/1985 | Rannenberg ........... | B64D 13/06 62/172 |
| 5,323,624 A | * | 6/1994 | Schwalm ............... | B64D 13/06 62/401 |
| 5,461,882 A | * | 10/1995 | Zywiak .............. | B60H 1/00007 62/401 |
| 5,704,218 A | * | 1/1998 | Christians .............. | B64D 13/06 62/172 |

(Continued)

FOREIGN PATENT DOCUMENTS

| | | |
|---|---|---|
| EP | 2998224 A1 | 3/2016 |
| EP | 3363740 A1 | 8/2018 |

OTHER PUBLICATIONS

European Search Report; Application No. 18204383.6-1010; dated Mar. 27, 2019; 11 pages.

*Primary Examiner* — Kun Kai Ma
(74) *Attorney, Agent, or Firm* — Cantor Colburn LLP (57) ABSTRACT

An environmental control system of an aircraft includes a ram air circuit with a ram air shell having at least one heat exchanger positioned therein, a dehumidification system arranged in fluid communication with the ram air circuit, a compression device arranged in fluid communication with the ram air circuit and the at least one dehumidification system, and an expansion device arranged in fluid communication with the ram air circuit. At least one of the compression device and the expansion device is selectively operable to supplement the ram air within the ram air circuit to meet a demand of the aircraft.

18 Claims, 5 Drawing Sheets

(56) References Cited

U.S. PATENT DOCUMENTS

| | | | | |
|---|---|---|---|---|
| 6,124,646 | A * | 9/2000 | Artinian | B64D 13/06 |
| | | | | 290/52 |
| 6,257,003 | B1 * | 7/2001 | Hipsky | B64D 13/06 |
| | | | | 62/402 |
| 6,381,969 | B1 * | 5/2002 | Afeiche | B64D 13/06 |
| | | | | 62/87 |
| 6,402,812 | B1 * | 6/2002 | Perrotta | B01D 53/0476 |
| | | | | 95/95 |
| 8,973,393 | B2 | 3/2015 | Atkey et al. | |
| 9,302,775 | B2 | 4/2016 | Houssaye | |
| 9,669,936 | B1 | 6/2017 | Fiterman et al. | |
| 2002/0088245 | A1 * | 7/2002 | Sauterleute | B64D 13/06 |
| | | | | 62/402 |
| 2004/0194493 | A1 * | 10/2004 | Army, Jr. | F28F 9/26 |
| | | | | 62/402 |
| 2005/0061911 | A1 * | 3/2005 | Zywiak | B64D 13/00 |
| | | | | 244/53 R |
| 2006/0196216 | A1 * | 9/2006 | Bruno | B64D 13/06 |
| | | | | 62/402 |
| 2008/0110193 | A1 * | 5/2008 | Jonqueres | B64D 13/06 |
| | | | | 62/331 |
| 2010/0323601 | A1 | 12/2010 | Cremers et al. | |
| 2016/0312648 | A1 * | 10/2016 | Bruno | F01D 17/105 |
| 2016/0347456 | A1 * | 12/2016 | Bruno | B64D 13/06 |
| 2016/0355267 | A1 * | 12/2016 | Bruno | B64D 13/06 |
| 2017/0129614 | A1 | 5/2017 | Bammann et al. | |
| 2019/0002108 | A1 * | 1/2019 | Bruno | B64D 13/04 |
| 2019/0002109 | A1 * | 1/2019 | Bruno | B64D 13/08 |
| 2019/0135440 | A1 * | 5/2019 | Bruno | B64D 13/06 |
| 2019/0135441 | A1 * | 5/2019 | Bruno | B64D 13/06 |
| 2019/0225343 | A1 * | 7/2019 | Bruno | B64D 13/06 |

* cited by examiner

REGENERATIVE SYSTEM ECOECS

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards smaller systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn.

BRIEF DESCRIPTION

According to one or more embodiments, an environmental control system of an aircraft includes a ram air circuit with a ram air shell having at least one heat exchanger positioned therein, a dehumidification system arranged in fluid communication with the ram air circuit, a compression device arranged in fluid communication with the ram air circuit and the at least one dehumidification system, and an expansion device arranged in fluid communication with the ram air circuit. At least one of the compression device and the expansion device is selectively operable to supplement the ram air within the ram air circuit to meet one or more demands of the aircraft.

In addition to one or more of the features described above, or as an alternative, in further embodiments the expansion device is a simple cycle expansion device.

In addition to one or more of the features described above, or as an alternative, in further embodiments the expansion device includes a fan operably coupled to a turbine via a shaft, the fan being arrange in fluid communication with the ram air circuit.

In addition to one or more of the features described above, or as an alternative, in further embodiments the compression device is selectively operable to supplement the ram air with a first medium and the at least one expansion device is selectively operable to supplement the ram air with a second medium.

In addition to one or more of the features described above, or as an alternative, in further embodiments when the environmental control system is in a first mode of operation, a first portion of the first medium is provided to the expansion device and a second portion of the first medium is provided to the compression device.

In addition to one or more of the features described above, or as an alternative, in further embodiments when the environmental control system is in the first mode of operation, the second medium is not provided to the environmental control system.

In addition to one or more of the features described above, or as an alternative, in further embodiments the environmental control system is operable in the first mode when the aircraft is on the ground.

In addition to one or more of the features described above, or as an alternative, in further embodiments when the environmental control system is in a second mode of operation, the first medium provided to the expansion device is reduced compared to the first mode.

In addition to one or more of the features described above, or as an alternative, in further embodiments the environmental control system is operable in a second mode when the aircraft is in flight.

In addition to one or more of the features described above, or as an alternative, in further embodiments when the environmental control system is in a second mode of operation the environment control system receives the first medium and a third medium, but only the third medium is provided to a volume of the aircraft.

In addition to one or more of the features described above, or as an alternative, in further embodiments the environmental control system is operable in the third mode when the aircraft is flying at low altitude.

In addition to one or more of the features described above, or as an alternative, in further embodiments the compression device further includes a turbine configured to provide energy by expanding a first medium, and a compressor configured to receive energy from the first medium being expanded across the turbine, the compressor being configured to compress a second medium.

In addition to one or more of the features described above, or as an alternative, in further embodiments the first medium is bleed air.

In addition to one or more of the features described above, or as an alternative, in further embodiments the bleed air circuit is drawn from at least one of an engine and an auxiliary power unit.

In addition to one or more of the features described above, or as an alternative, in further embodiments the second medium is fresh air.

In addition to one or more of the features described above, or as an alternative, in further embodiments the compression device further includes a power turbine configured to provide energy to the compressor by expanding one of the first medium and a third second medium.

In addition to one or more of the features described above, or as an alternative, in further embodiments the first turbine is configured to provide energy by expanding both the first medium and the second medium.

In addition to one or more of the features described above, or as an alternative, in further embodiments the at least one heat exchanger includes a first heat exchanger, a second heat exchanger, and a third heat exchanger, the first heat exchanger and the third heat exchanger being arranged in fluid communication.

In addition to one or more of the features described above, or as an alternative, in further embodiments including a regenerative heat exchanger arranged in fluid communication with at least one of the first heat exchanger, the second heat exchanger, and the third heat exchanger.

In addition to one or more of the features described above, or as an alternative, in further embodiments the regenerative heat exchanger receives a medium output from at least one of the expansion device and the compression device.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses energy from one or more of the different sources to power the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

Figure 1:
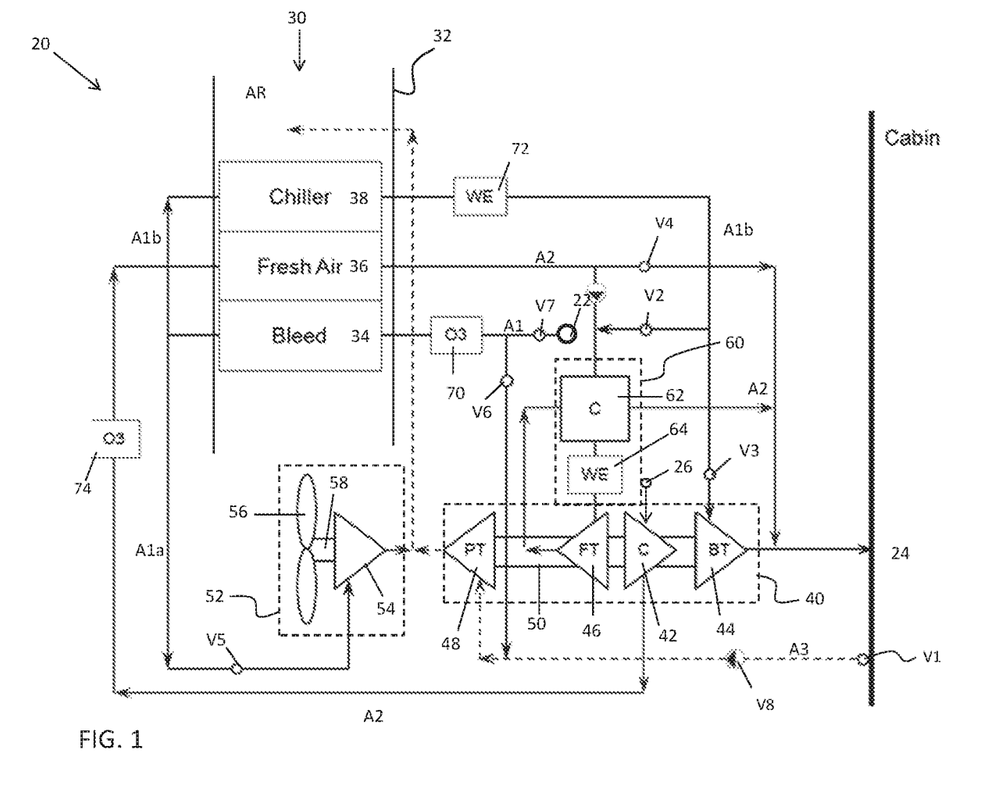
FIG. 1 is a simplified schematic diagram of a system according to an embodiment.

With reference now to FIG. 1, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIG., the system 20 can receive a first medium A1 at a first inlet 22. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 also receives a second medium A2 at an inlet 26 and may provide a conditioned form of at least one of the first medium A1 and the second medium A2 to a volume 24. In an embodiment, the second medium A2 is fresh air, such as outside air for example. The outside air can be procured via one or more scooping mechanisms, such as an impact scoop or a flush scoop for example. Thus, the inlet 26 can be considered a fresh or outside air inlet. Generally, the fresh air A2 described herein is at an ambient pressure equal to an air pressure outside of the aircraft when the aircraft is on the ground, and is between an ambient pressure and a cabin pressure when the aircraft is in flight.

The system 20 can further receive a third medium A3 from the volume 24. In one embodiment, the volume 24 is the cabin of an aircraft and the third medium A3 is cabin discharge air, which is air leaving the volume 24 that would typically be discharged overboard. In some embodiments, the system 20 is configured to extract work from the third medium A3. In this manner, the pressurized air A3 of the volume 24 can be utilized by the system 20 to achieve certain operations.

The environmental control system 20 includes a RAM air circuit 30 including a shell or duct, illustrated schematically at 32, within which one or more heat exchangers are located. The shell 32 can receive and direct a medium, such as ram air AR for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first heat exchanger 34, a second heat exchanger 36, and a third heat exchanger 38. Within the heat exchangers 34, 36, 38, ram air AR, such as outside air for example, acts as a heat sink to cool a medium passing there through, for example the first medium A1 and/or the second medium A2.

The system 20 additionally comprises at least one compression device 40. In the illustrated, non-limiting embodiment, the compression device 40 of the system 20 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of the compression device 40 include an air cycle machine, a three-wheel air cycle machine, a four-wheel air cycle machine, etc.

As shown, the compression device 40 includes a compressor 42, a bleed air turbine 44, a fresh air turbine 46, and a power turbine 48 operably coupled to each other via a shaft 50. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2. The bleed air turbine 44, the fresh air turbine 46, and the power turbine 48 are mechanical devices that expand a medium and extract work therefrom (also referred to as extracting energy). In the compression device 40, the turbines 44, 46, and 48 drive the compressor 42 via the shaft 50.

The system 20 additionally comprises at least one expansion device 52. The expansion device 52 is a mechanical device, similar to the compression device 40, and includes components for performing thermodynamic work on a medium (e.g., extracts work from or applies work to the first medium A1 by raising and/or lowering pressure and by raising and/or lowering temperature). Examples of the expansion device 52 include, but are not limited to, a simple air cycle machine or a tip turbine fan etc.

In the illustrated, non-limiting embodiment, the expansion device 52 is a two-wheel air cycle machine including a turbine 54 and a fan 56 operably coupled via a shaft 58. However, it should be understood that any suitable expansion device, including an air cycle machine having any number of wheels (i.e. three-wheel or four-wheel) are also within the scope of the disclosure. The turbine 54 is a mechanical device that expands a medium and extracts work therefrom. In the expansion device 52, the turbine 54 drives rotation of the fan 56 via the shaft 58. In a non-limiting embodiment, the turbine 54 can comprise a nozzle configured to accelerate a medium supplied thereto for entry into a turbine impeller (not shown). The fan 56 is a mechanical device that can force via push or pull methods a medium (e.g., ram air) through the shell 32 across the one or more ram heat exchangers 34, 36, 38 and at a variable cooling to control temperatures.

The system 20 additionally includes at least one dehumidification system 60. In the illustrated, non-limiting embodiment, the dehumidification system 60 includes a condenser 62 and a water collector 64. The condenser 62 is a particular type of heat exchanger and the water collector 64 is a mechanical device that performs a process of removing water from a medium.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 is configured to control a supply of the third medium A3 to the system 20. A second valve V2 may be operable may be operable to control a temperature of the medium downstream from the third heat exchanger, and a third valve V3 may be operable to control a flow of a medium to the bleed air turbine 44. Operation of a fourth valve V4 allows a medium to selectively bypass the compression device 40 and a fifth valve V5 is configured to control a supply of a medium to the expansion device 52. Another valve V7 may be located directly downstream of the inlet port 22 of the first medium A1 to control a flow of the first medium A1 provided to the system 20. In addition, a check valve V8 may be positioned along the flow of the third medium A3, downstream from the inlet valve V1 and upstream from the power turbine 48. The check valve V8 is configured to prevent a backwards flow into the volume 24.

The system 20 is operable in a plurality of modes, selectable based on a flight condition of the aircraft. In an embodiment, the system 20 is operable in a first mode when the aircraft is on the ground and in a second mode when the aircraft is in flight, such as high altitude cruise, climb, and/or descent for example. In the first mode, valve V1 for controlling a supply of the third medium A3 to the system 20 is closed. Accordingly, the third medium A3 is not used to operate the system 20 when the aircraft is on the ground. Valve V7 is open and the first medium A1 drawn through the inlet port 22 may pass through an ozone converter, illustrated at 70, before being provided to the first heat exchanger 34. Within the first heat exchanger 34, the first medium A1 is cooled via a flow of ram air AR.

During operation on the ground, the valve V5 of the system 20 is in an open position. As a result, a first portion A1a of the first medium A1 output from the first heat exchanger 34 is directed towards the expansion device 52. The partially cool first medium A1a is provided to the turbine 54 of the expansion device 52 where it is expanded and work is extracted, thereby driving operation of the fan 56 which moves ram air AR through the ram air circuit 30. In an embodiment, the first portion A1a of the first medium A1 output from the turbine 54 of the expansion device 52 is directed to an inlet of the ram air circuit 30, where it is combined with the ram air AR before flowing across the rani air heat exchangers 34, 36, 38. In an embodiment, the first portion A1a of the first medium A1 is provided to the ram air circuit 30 near the exit of the high pressure air of the heat exchangers 34, 36, 38. This additional air provided from the expansion device 52 is intended to supplement the cooling performed by the ram air circuit 30. For example, this additional air may be useful when the ram air AR in the ram air circuit 30 is incapable of cooling the mediums within the heat exchangers 34, 36, 38 to a temperature necessary to meet the demands, such as cooling demands for example, of the aircraft.

A second portion A1b of the first medium A1 passes from the first heat exchanger 34 to the third heat exchanger 38. Within the third heat exchanger 38, the moisture within the first medium A1b condenses. Moisture is removed from the wet first medium A1b within a water extractor 72 before being provided to the inlet of the bleed air turbine 44. Within the turbine 44, the first medium A1b is expanded and work is extracted, to power operation of the compressor 42. The first medium A1b output from the bleed air turbine 44 is then sent to one or more loads, including the volume 24.

Simultaneously, a supply of second medium A2 is compressed within the compressor 42 causing the temperature of the second medium A2 to increase. The second medium A2 output from the compressor 42 passes sequentially through an ozone converter 74 and the second heat exchanger 36 to cool the second medium A2 to about an ambient temperature. The compressed second medium A2 output from the second heat exchanger 36 is provided to the condenser 62 and then to the water extractor 64 of the dehumidification system 60 to condense and remove moisture therefrom.

The cool second medium A2 having a medium pressure is then provided to the fresh air turbine 46 of the expansion device 40 where it is expanded and work is extracted, thereby driving operation of the compressor 42. The second medium A2 output from the turbine 46 of the expansion device 40 is returned to the condenser 62. The second medium A2 output from the fresh air turbine 46 cools the second medium A2 output from the second heat exchanger 36 within the condenser 62. From the condenser 62, the second medium A2 is combined with the first medium A1b output from the bleed air turbine 44 before being sent to one or more loads, including the volume 24.

In the second mode of operation of the system 20, Valve V1 may be open to provide the third medium A3 to the system 20. The third medium A3 is supplied to the power turbine 48 of the compression device 40. Within the turbine 48, the third medium A3 is expanded and work is extracted, to power operation of the compressor 42. The third medium A3 output from the power turbine 48 may be provided to a downstream portion of the system 20. In an embodiment, the third medium A3 is directed to an inlet of the ram air circuit 30, where it is combined with the ram air AR before flowing across the ram air heat exchangers 34, 36, 38. In addition, valve V5 disposed upstream from the expansion device 52 may be closed. In such embodiments, because no medium is provided to the expansion device 52 when the valve V5 is closed, the expansion device 52 is non-operational in the second mode. However, because the system 20 is in the second mode when the aircraft is in flight (at altitude), the forward movement of the aircraft is sufficient to draw ram air AR through the ram air circuit 30 without the use of the fan 56. Alternatively, valve V5 may be partially closed to control or limit the flow of the first portion A1b of the first medium A1 to the expansion device 52. In an embodiment, the valve V5 is opened to allow the turbine 54 of the expansion device 52 to maintain a minimum speed required for proper operation of an air bearing (not shown) of the expansion device 52. When valve V5 is only partially closed, the flow of the first medium A1b output from the expansion device 52 may also be provided to another component within the system 20, such as to the ram air circuit 30 for example.

In addition, in the second mode, valve V4 is open such that at least portion of the second medium A2 output from the second heat exchanger 36 is able to bypass the dehumidification system 60 and the compression device 40. As a result, the second medium A2 output from the second heat exchanger 36 is mixed with the first medium A1 output from the bleed turbine 44 before being sent to one or more loads, including the volume 24. In an embodiment, the valve V6 may be at least partially open during the second mode of operation to add additional heat via the first medium A1 to the flow of the third medium A3 from the volume 24.

The system 20 may also be operated in a third mode, referred to as a "100% Fresh Air" mode. In the third, mode of operation, only the second medium A2 is provided to the volume 24 or other loads and may be used when the aircraft is flying at low altitude. However, it should be understood that the "100% Fresh Air" mode may be adapted for use in any flight condition. In the third, "100% Fresh Air" mode, valves V2 and V3 are closed, valve V5 is closed or partially closed, and valve V6 adjacent the inlet port 22 for the first medium A1 is open. As a result, the first medium A1 drawn through the inlet port 22 is provided to the power turbine 48. Within the power turbine 48, the first medium A1 is expanded and work is extracted, to power operation of the compressor 42. The first medium A1 is expelled from the power turbine 48 is then dumped within the ram air circuit 30.

Figure 2:
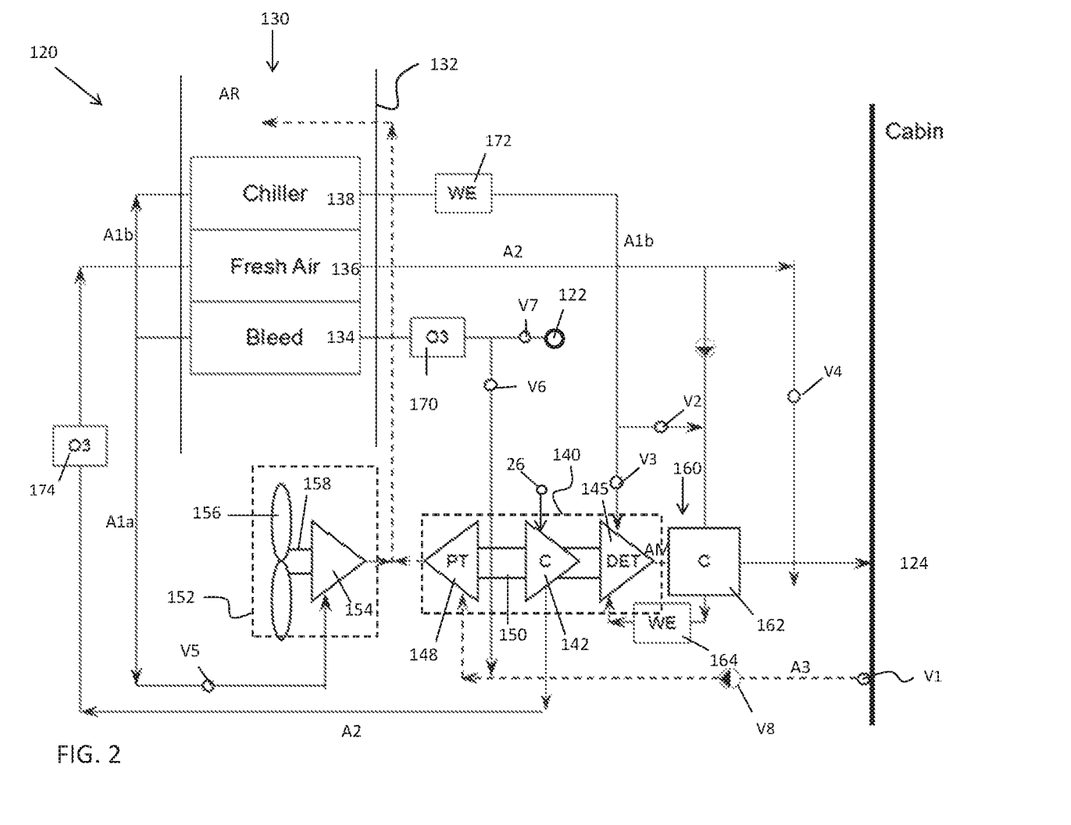
FIG. 2 is a simplified schematic diagram of another system according to an embodiment.

With reference now to FIG. 2, another system 120 having an alternative configuration is illustrated. Identical components have similar numbers between the various embodiments. System 120 is substantially similar to the system 20 set forth in FIG. 1, with the exception of the compression device 140. In the illustrated, non-limiting embodiment, the compression device 140 includes a compressor 142, a turbine 145, and a power turbine 148 operably coupled by a shaft 150. The turbine 145 can be a dual entry turbine that includes a plurality of inlet gas flow paths, such as an inner flow path and an outer flow path, to enable mixing of alternative medium flows at the exit of the turbine 145. The inner flow path can be a first diameter, and the outer flow path can be a second diameter. In a non-limiting embodiment, the turbine 145 can comprise a first nozzle configured to accelerate the first medium A1 for entry into a turbine impeller and a second nozzle is configured to accelerate the second medium A2 for entry into the turbine impeller. The turbine impeller (not shown) can be configured with a first gas path configured to receive the first medium A1 from the first nozzle and with a second gas path configured to receive the second medium A2 from the second nozzle.

The system 120 of FIG. 2 is similarly operable in a plurality of modes. In a first mode, the valve V1 is closed so that the third medium A3 is not used to operate the system 120. The first medium A1 drawn from the inlet port 122 and through valve V7 may pass through an ozone converter 170 before being provided to the first heat exchanger 134. Within the first heat exchanger 134, the first medium A1 is cooled via a flow of ram air AR. As previously described with respect to FIG. 1, a first portion A1a of the first medium A1 output from the first heat exchanger 134 is provided to the turbine 154 of the expansion device 152 where it is expanded and work is extracted, thereby driving operation of the fan 156 which moves ram air AR through the ram air circuit 130. The first portion A1a of the first medium A1 output from the turbine 154 of the expansion device 152 is directed to an inlet of the ram air circuit 130, where it is combined with the ram air AR before flowing across the ram air heat exchangers 134, 136, 138.

A second portion A1b of the first medium A1 passes from the first heat exchanger 134 to the third heat exchanger 138. Within the third heat exchanger 138, the moisture within the first medium A1b condenses. Moisture is removed from the wet first medium A1b within a water extractor 172 before being provided to a first inlet of the dual entry turbine 145. Within the turbine 145, the first medium A1 is expanded and work is extracted, to power operation of the compressor 142.

Simultaneously, a supply of second medium A2 is compressed within the compressor 142 causing the temperature of the second medium A2 to increase. The second medium A2 output from the compressor 142 passes sequentially through an ozone converter 174 and the second heat exchanger 136 to cool the second medium A2 to about an ambient temperature. The compressed second medium A2 output from the second heat exchanger 136 is provided to the condenser 162 and then to the water extractor 164 of the dehumidification system 160 to condense and remove moisture therefrom.

The cool second medium A2 having a medium pressure is provided to a second inlet of the dual entry turbine 145 where it is expanded and work is extracted, thereby driving operation of the compressor 142. The two air flows (i.e., the bleed air A1b from the water extractor 172 and the fresh air A2 from the water extractor 164) may be mixed at the turbine 145 to produce a mixed air AM. The mixed air AM leaves the turbine 145 and enters the condenser 162, where it is warmed through a heat exchange relationship with the cool fresh air A2 output from the secondary heat exchanger 136. The conditioned mixed air AM is then sent to condition the volume 124.

In a second mode of operation of the system 120, valve V5 may be partially closed, thereby limiting the amount of first medium A1 provided to the expansion device 152. The first medium A1 output from the expansion device 152 is provided to another portion of the system 120, such as the ram air circuit 130 for example. Alternatively, the valve V5 may be fully closed such that the downstream expansion device 152 is non-operational. However, because the system 120 is typically in the second mode when the aircraft is in flight, the motion of the aircraft is sufficient to draw ram air AR through the ram air circuit 130 without the use of the fan 156. Valve V1 is operated to supply a third medium A3 to the power turbine 148 of the compression device 140. Within the power turbine 148, the third medium A3 is expanded and work is extracted, to power operation of the compressor 142. The third medium A3 output from the power turbine 148 is then directed to another portion of the system, such as the inlet of the ram air circuit 130, where it is combined with the ram air AR before flowing across the ram air heat exchangers 134, 136, 138.

Additionally, in the second mode valve V4 is open such that at least a portion of the second medium A2 output from the second heat exchanger 136 is able to bypass the bypass the dehumidification system 160 and the compression device 140. In an embodiment, valve V6 may be at least partially open during the second mode of operation to add additional heat via the first medium A1 to the flow of the third medium A3 from the volume 24.

During operation of the system 120 in a third mode, valves V2 and V3 are closed, valve V5 is closed or partially closed, and valves V6 and V7 adjacent the inlet port 122 for the first medium A1 are open. As a result, the first medium A1 drawn from the inlet port 122 is provided to the power turbine 148. Within the power turbine 148, the first medium A1 is expanded and work is extracted, to power operation of the compressor 142. The first medium A1 expelled from the power turbine 148 may be provided to a downstream portion of the system, i.e. dumped within the ram air circuit 130.

Figure 3A:
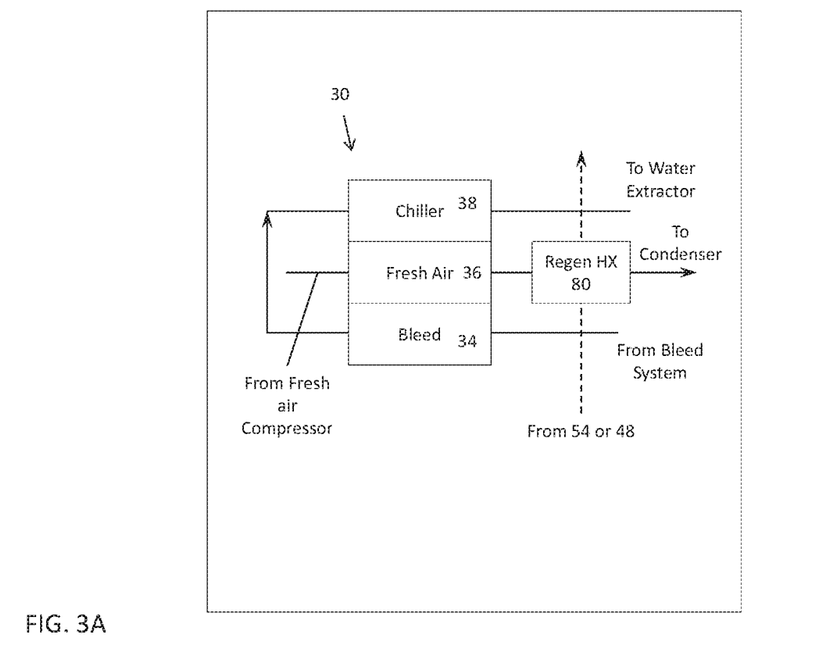
FIG. 3a-3c are simplified schematic diagram of a portion of a system according to an embodiment.
Figure 3B:
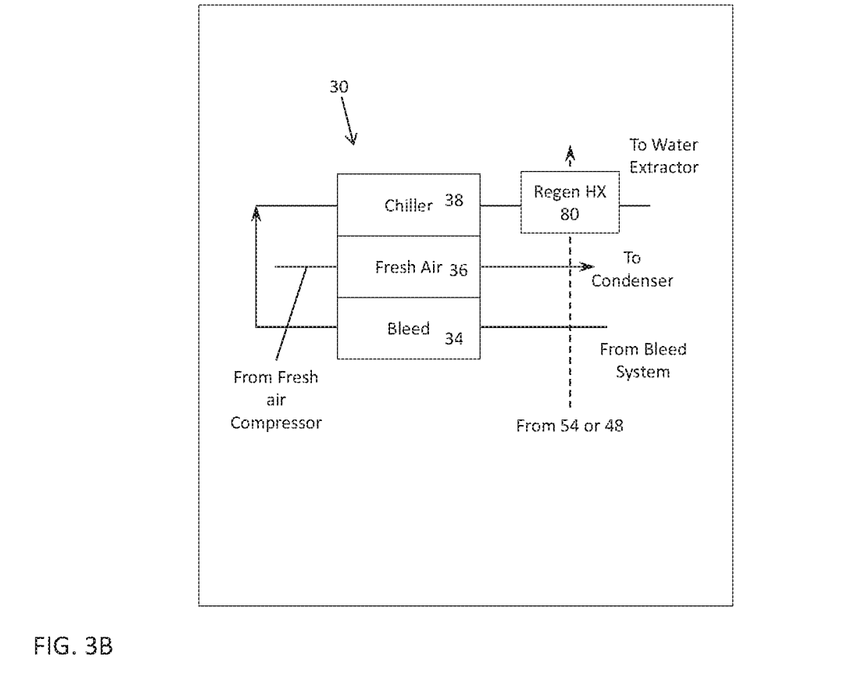
Figure 3C:
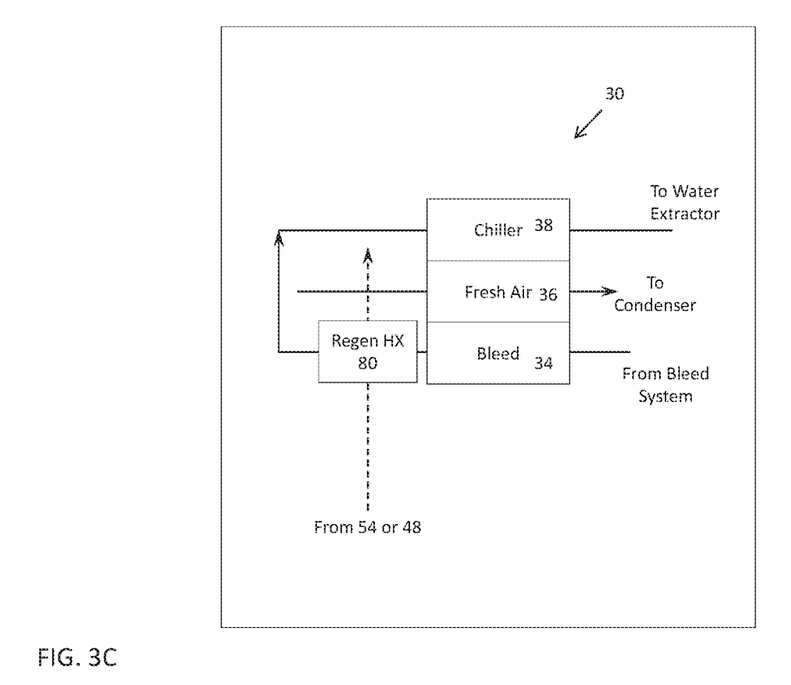

With reference now to FIGS. 3A-3C, the system 20, 120 may additionally include a regenerative heat exchanger 80 arranged in fluid communication with any of the ram air heat exchangers 34, 36, 38 of the ram air circuit 30. In an embodiment, the regenerative heat exchanger 80 is positioned downstream from the outlet of the secondary heat exchanger 36. In another embodiment, the regenerative heat exchanger 80 is positioned downstream from the third heat exchanger 38 (see FIG. 3B), or alternatively, downstream from the first heat exchanger 34 and upstream from the third heat exchanger 38 (see FIG. 3C).

The regenerative heat exchanger 80 may be located within the duct 32 of the ram air circuit 30, or may be arranged outside of the duct 32. Regardless of the position of the regenerative heat exchanger 80 relative to the ram air circuit 30, one of the first medium A1 output from the turbine 54 of the expansion device 52, the third medium A3 output from the power turbine 48 or a combination of first medium and third medium A1, A3 is configured to act as a heat sink to cool a medium passing through the regenerative heat exchanger 80. In embodiments where a first medium A1 is output from the expansion device 52 and the third medium A3 is output from the power turbine 48, one of the first medium A1 and the third medium A3 may be provided to the regenerative heat exchanger 80 and the other of the first medium A1 and the third medium A3 may be provided to the ram air circuit 30 adjacent the inlet, Although FIGS. 3A-3C are illustrated with respect to system 20, it should be understood that system 120 may similarly be adapted to incorporate the regenerative heat exchanger 80.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system of an aircraft comprising:
    a ram air circuit including a ram air shell having at least one heat exchanger positioned therein;
    a dehumidification system arranged in fluid communication with the ram air circuit;
    an air cycle machine arranged in fluid communication with the ram air circuit and the dehumidification system;
    an expansion device, separate from the air cycle machine, arranged in fluid communication with the ram air circuit, wherein an outlet of the expansion device is fluidly coupled to the ram air circuit; and
    a regenerative heat exchanger arranged in fluid communication with the at least one heat exchanger, the regenerative heat exchanger being arranged downstream from an outlet of the air cycle machine and the outlet of the expansion device;
    wherein the air cycle machine is selectively operable to supplement the ram air within the ram air circuit with a first medium to meet a demand of the aircraft;
    wherein when the environmental control system is in a first mode of operation, a first portion of a first medium is provided to the expansion device and a second portion of the first medium is provided to the air cycle machine.

2. The environmental control system of claim 1, wherein the expansion device is a simple cycle expansion device.

3. The environmental control system of claim 1, wherein the expansion device includes a fan operably coupled to a turbine via a shaft, the fan being arranged in fluid communication with the ram air circuit.

4. The environmental control system of claim 1, the expansion device is selectively operable to supplement the ram air with a second medium.

5. The environmental control system of claim 4, wherein when the environmental control system is in the first mode of operation, the second medium is not provided to the environmental control system.

6. The environmental control system of claim 4, wherein the environmental control system is operable in the first mode when the aircraft is on the ground.

7. The environmental control system of claim 4, wherein when the environmental control system is in a second mode of operation, the first medium provided to the expansion device is reduced compared to the first mode.

8. The environmental control system of claim 7, wherein the environmental control system is operable in a second mode when the aircraft is in flight.

9. The environmental control system of claim 4, wherein when the environmental control system is in a second mode of operation the environment control system receives the first medium and a third medium, but only the third medium is provided to a volume of the aircraft.

10. The environmental control system of claim 9, wherein the environmental control system is operable in the third mode when the aircraft is flying at low altitude.

11. The environmental control system of claim 1, wherein the air cycle machine further includes:
    a turbine configured to provide energy by expanding a first medium;
    a compressor configured to receive energy from the first medium being expanded across the turbine, the compressor being configured to compress a second medium.

12. The environmental control system of claim 10, wherein the first medium is bleed air.

13. The environmental control system of claim 12, wherein the bleed air is drawn from at least one of an engine and an auxiliary power unit.

14. The environmental control system of claim 10, wherein the second medium is fresh air.

15. The environmental control system of claim 10, wherein the air cycle machine further includes a power turbine configured to provide energy to the compressor by expanding one of the first medium and a third second medium.

16. The environmental control system of claim 10, wherein first turbine is configured to provide energy by expanding both the first medium and the second medium.

17. The environmental control system of claim 1, wherein the at least one heat exchanger includes a first heat exchanger, a second heat exchanger, and a third heat exchanger, the first heat exchanger and the third heat exchanger being arranged in fluid communication.

18. The environmental control system of claim 17, wherein the regenerative heat exchanger receives a medium output from at least one of the expansion device and the air cycle machine.

\* \* \* \* \*